(12) United States Patent
Angelucci (10) Patent No.: US 12,221,212 B2
(45) Date of Patent: Feb. 11, 2025

(54) INTEGRATED CONVERTIBLE QUADCOPTER WITH FULL FIELD OF REGARD

(71) Applicant: Lockheed Martin Corporation, Bethesda, MD (US)

(72) Inventor: Marc T. Angelucci, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/342,992

(22) Filed: Jun. 28, 2023

(65) Prior Publication Data

US 2024/0132210 A1 Apr. 25, 2024
US 2024/0239483 A9 Jul. 18, 2024

Related U.S. Application Data

(62) Division of application No. 17/360,814, filed on Jun. 28, 2021, now Pat. No. 11,814,172.

(51) Int. Cl.
| | |
|---|---|
| *B64C 39/02* | (2023.01) |
| *B64C 27/08* | (2023.01) |
| *B64U 10/13* | (2023.01) |
| *B64U 10/14* | (2023.01) |
| *B64U 20/87* | (2023.01) |
| *B64U 30/297* | (2023.01) |
| *B64U 30/20* | (2023.01) |
| *B64U 50/19* | (2023.01) |

(52) U.S. Cl.
CPC ............ *B64C 39/024* (2013.01); *B64C 27/08* (2013.01); *B64U 10/13* (2023.01); *B64U 10/14* (2023.01); *B64U 20/87* (2023.01); *B64U 30/297* (2023.01); *B64U 30/20* (2023.01); *B64U 50/19* (2023.01); *B64U 2201/10* (2023.01); *B64U 2201/20* (2023.01)

(58) Field of Classification Search
CPC ...... B64U 30/297; B64U 20/87; B64U 10/14; B64C 27/08; B64C 29/008; B64C 29/0033; G05D 1/0094
See application file for complete search history.

(56) References Cited

U.S. PATENT DOCUMENTS

| | | | | |
|---|---|---|---|---|
| 3,231,221 | A * | 1/1966 | Platt | B64C 29/0033 244/66 |
| 10,710,717 | B2 * | 7/2020 | Raffler | B64U 50/19 |
| 11,338,634 | B1 * | 5/2022 | Lacaze | B60F 5/02 |
| 2014/0034776 | A1 * | 2/2014 | Hutson | B64C 27/006 244/17.17 |
| 2014/0138477 | A1 * | 5/2014 | Keennon | G05D 1/005 244/17.23 |
| 2018/0215465 | A1 * | 8/2018 | Renteria | B64C 27/28 |
| 2019/0144116 | A1 * | 5/2019 | Yuan | B64U 50/19 701/3 |

* cited by examiner

*Primary Examiner* — Richard G Davis
(74) *Attorney, Agent, or Firm* — Baker Botts L.L.P.

(57) ABSTRACT

The present disclosure is directed to unmanned aerial vehicle (UAV) comprising a convertible body operably coupled to at least one sensor, and further configured to rotate at least about a longitudinal axis, thereby providing a full field of regard for the at least one sensor, and a plurality of arms extending laterally from the convertible body, each arm of the plurality of arms having a rotor assembly coupled thereto.

18 Claims, 6 Drawing Sheets

INTEGRATED CONVERTIBLE QUADCOPTER WITH FULL FIELD OF REGARD

CROSS-REFERENCE TO RELATED APPLICATION

This application is a divisional application of U.S. application Ser. No. 17/360,814 filed Jun. 28, 2021, and entitled "INTEGRATED CONVERTIBLE QUADCOPTER WITH FULL FIELD OF REGARD," which is herein incorporated by reference in its entirety.

TECHNICAL FIELD OF THE DISCLOSED SUBJECT MATTER

The present disclosure generally relates to unmanned aerial vehicles (UAVs) such as quadcopters, and more specifically to integrated convertible quadcopters with a full field of regard.

BACKGROUND OF THE DISCLOSED SUBJECT MATTER

An unmanned aerial vehicle (UAV) is an aircraft capable of flight without an on-board human pilot. The path of flight of a UAV may be based on programmed instructions, remote control operations, or by UAV embedded controllers. With advancements in aviation technology, UAVs may be utilized in various applications. For example, UAVs may be utilized for surveillance, disaster control, emergency response, monitoring of critical utilities, and other operations. Advanced applications of UAVs may also include weather observation, topographical survey, and various military applications.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes an unmanned aerial vehicle comprising a convertible body operably coupled to at least one sensor, and further configured to rotate at least about a longitudinal axis, thereby providing a full field of regard for the sensor, and a plurality of arms extending laterally from the convertible body, each arm of the plurality of arms having a rotor assembly coupled thereto.

Additionally, the convertible body may be defined by a first opposing pole and a second opposing pole, the first opposing pole coupled to a first bearing containing a first motor, and the second opposing pole coupled to a second bearing containing a second motor, and wherein the longitudinal axis is defined by the first and second opposing poles. The first bearing and the second bearing may each be coupled to at least two arms of the plurality of arms, and the convertible body may be configured to rotate about the longitudinal axis relative to the plurality of arms via the first and second bearings.

Moreover, the convertible body may comprise an outer housing comprising a base having at least a bottom planar surface, and an upper surface with an integrated extended surface for cooling; and internal electronic components comprising at least an internal battery and a controlling circuitry. The internal electronic components may be conformed to a shape of the outer housing and may be operable for structural load sharing. The bottom planar surface of the base may be configured for landing. Also, the integrated extended surface may provide increased surface area for exchanging ambient heat.

Further, the unmanned aerial vehicle may be launched when the convertible body is in an upright position. The convertible body may be operable to rotate about the longitudinal axis after ascending to at least a predetermined threshold elevation above ground level. Also, the unmanned aerial vehicle may be operable to descend below the predetermined threshold elevation only when the convertible body is in the upright position.

In accordance with another aspect of the disclosed subject matter, a system may include one or more processors and one or more computer-readable non-transitory storage media comprising instructions that, when executed by the one or more processors, cause performance of operations including launching the UAV from an upright position to at least a predetermined threshold elevation above ground level, the upright position defined by nonrotation of a convertible body of the UAV from an initial position; enabling conversion of the UAV, the conversion defined by rotating the convertible body about a longitudinal axis, the conversion operable to achieve a full field of regard for at least one payload coupled to the convertible body of the UAV; and returning the UAV to the upright position for landing.

Moreover, the convertible body may comprise an outer housing defined by at least an upper surface and a base having a bottom planar surface. The upright position may further be defined as a position in which the bottom planar surface of the convertible body is perpendicular to a vertical axis extending from the ground level. Also, the payload may be coupled to the upper surface of the convertible body.

Further, the UAV may comprise a plurality of arms, each arm of the plurality of arms including a rotor assembly having a motor and at least one propeller. The operation of enabling conversion may further comprise autonomously adjusting a force of each propeller based on a direction of rotation of the convertible body, the force of each propeller operable to counterbalance the rotation of the convertible body.

Additionally, the operation of launching the UAV to the predetermined threshold elevation may be autonomous, and control may be passed to an operator after the UAV reaches at least the threshold elevation. Likewise, the operation of returning the UAV to the upright position for landing may also be autonomous. The UAV may be operable to descend below the predetermined threshold elevation only when the convertible body is in the upright position.

Technical advantages of certain embodiments of this disclosure may include one or more of the following. The systems and operations described herein may allow for the in-flight conversion of UAVs, such as quadcopters, such that an appended sensor has a full field of regard (e.g., 360° view, above and below its equator). As a result, unlike conventional quadcopter designs that require multiple sensors to cover various views, the quadcopters of the present disclosure require only a single sensor suite, thereby allowing for a simplified design and greater weight efficiency. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

The subject matter of the application will be more readily understood from the following detailed description when read in conjunction with the accompanying drawings, in which.

DETAILED DESCRIPTION

Unmanned aerial vehicles have the ability to carry out a range of tasks in numerous contexts, from military operations and law enforcement surveillance to geographic mapping and agricultural surveys. UAVs may be fitted with sensors and are increasingly used for applications involving aerial reconnaissance. A UAV may be powered by either a single gas-powered engine or several electric powered motors, with the lift being generated by one or more spinning rotors having radially disposed blades or propellers extending from a central hub. UAVs with four rotors are generally referred to as quadcopters.

UAVs may be modified or adapted for various applications by appending electronics, hardware, peripheral devices, and/or other payload to its core structure. For example, certain UAV implementations may require one or more sensors that capture video or camera feed. However, because UAVs conventionally remain upright during flight, a given sensor may be limited in its field of regard. Therefore, multiple sensors may be required to be fitted on various sides and surfaces of the UAV to achieve a full field of regard (i.e., a 360° field of view). However, the addition of payload to the UAV increases its weight and may adversely impact its aerodynamic drag.

The present disclosure is directed to an integrated, convertible UAV, and more particularly, a quadcopter, that is operable to convert during flight, thereby providing a full field of regard for any attached sensor or payload. Additionally, the UAV of the present disclosure is designed holistically, with the convertible body of the UAV having an outer housing that serves as an exoskeleton and internal components custom-fitted to the outer housing and sharing in the load factor, thereby allowing for a net reduction in size and weight.

Figure 1A:
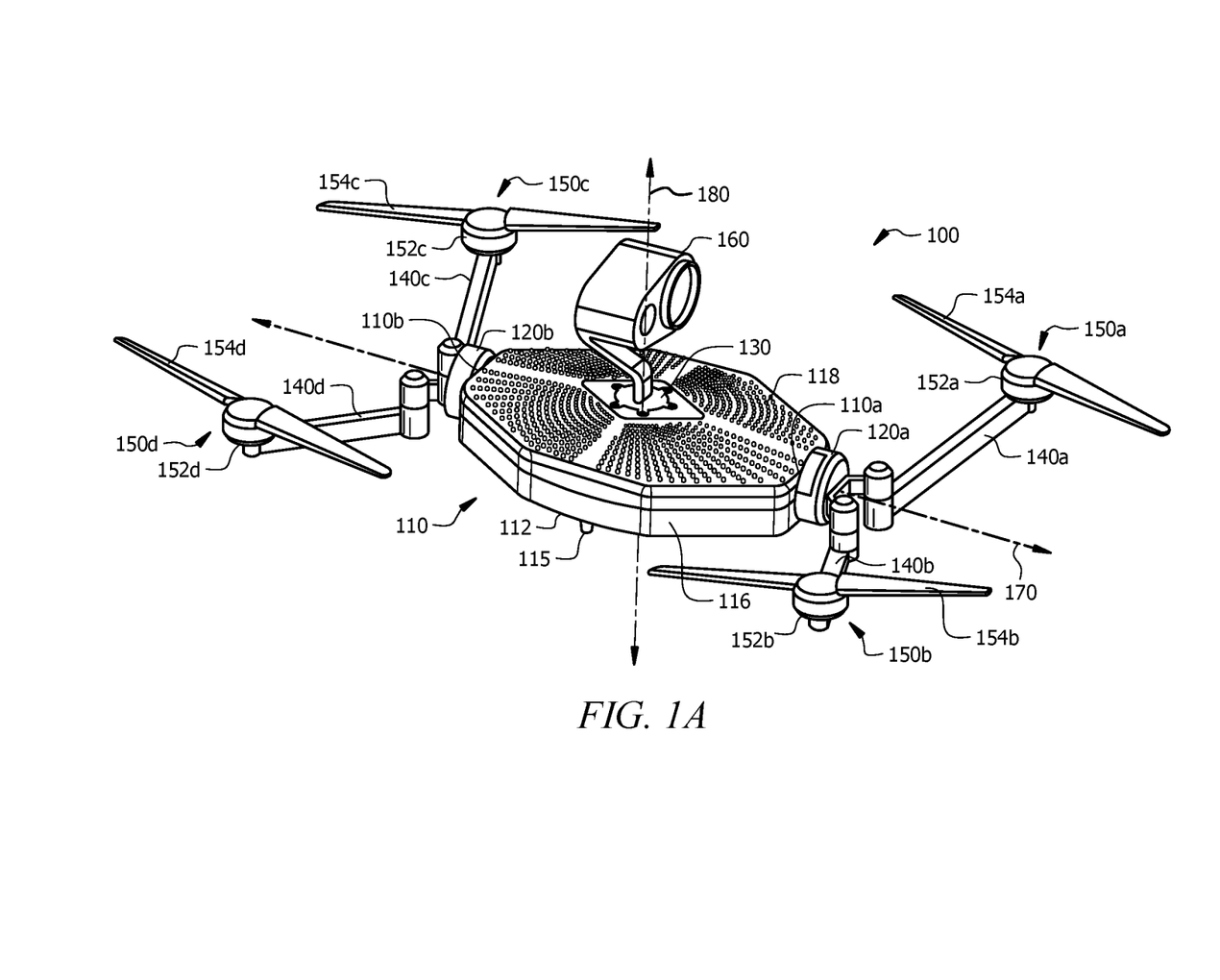
FIG. 1A illustrates a perspective view of a convertible quadcopter, in accordance with certain embodiments.
Figure 1B:
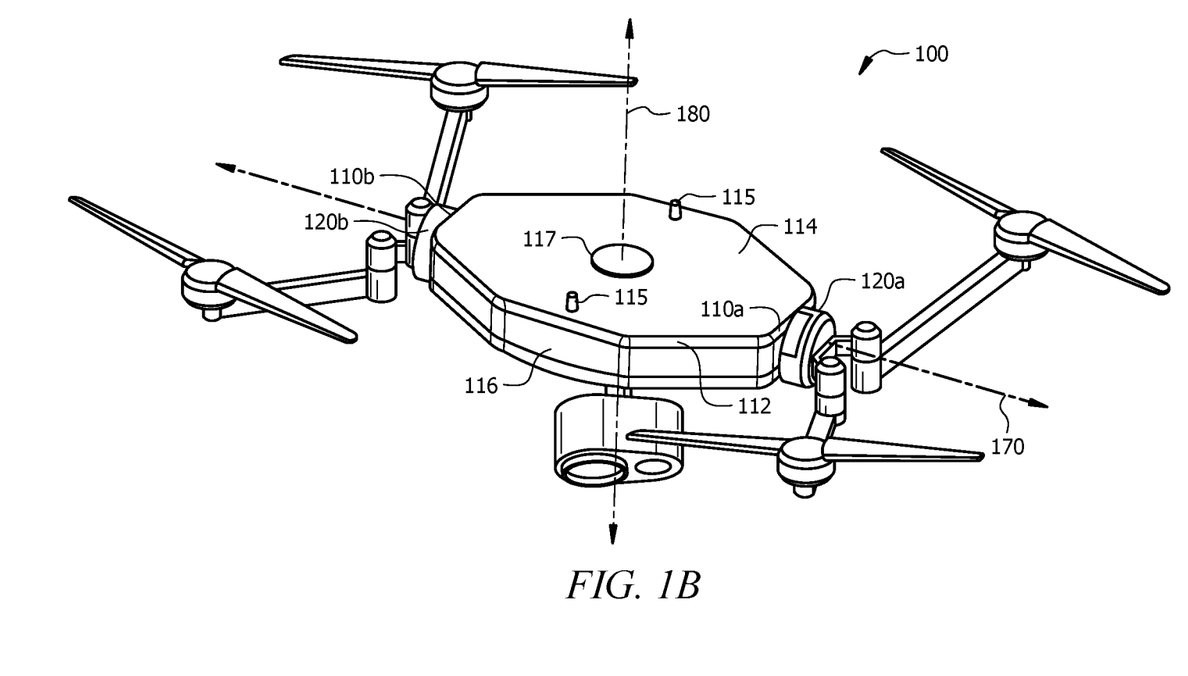
FIG. 1B illustrates another perspective view of a convertible quadcopter, in accordance with certain embodiments.

Reference will now be made in detail to embodiments of the disclosed subject matter, an example of which is illustrated in the accompanying drawings. FIGS. 1A and 1B depict a UAV in accordance with the present disclosure. For purposes of illustration and not limitation, the UAV of FIGS. 1A and 1B comprises, and the present disclosure describes, a quadcopter 100. However, it is to be understood that the present disclosure is not necessarily limited to quadcopters, and the principles disclosed herein may have applicability to various types or forms of aerial vehicles, including UAVs, as understood by one of skill in the art.

The quadcopter 100 may comprise a convertible body 110. The term "convertible" refers to the ability of the quadcopter body to rotate and/or change its position relative to its arms during flight. The terms "convert" and "rotate" may be used interchangeably throughout this disclosure. FIG. 1A depicts a perspective view of the quadcopter 100 in an upright position, showing the top side of the convertible body 110. FIG. 1B depicts a perspective view of the quadcopter 100 in a converted position, showing the bottom side of the convertible body 110.

The convertible body 110 of the quadcopter 100 may be defined by two opposing poles on opposite ends of its length, a first opposing pole 110a and a second opposing pole 110b with a longitudinal axis 170 running therethrough. In other words, the longitudinal axis 170 may be defined by the first and second opposing poles 110a, 110b. In an embodiment, the longitudinal axis 170 comprises the axis about which the convertible body 110 may rotate. A first bearing assembly 120a may be coupled to the first opposing pole 110a, and a second bearing assembly 120b may be coupled to the second opposing pole 110b. The first and second bearing assemblies 120a, 120b may be configured to enable rotation of the convertible body 110 about the longitudinal axis 170. Moreover, each of the first and second bearing assemblies 120a, 120b may house a motor (not shown) that drives conversion of the quadcopter 100.

Figure 2A:
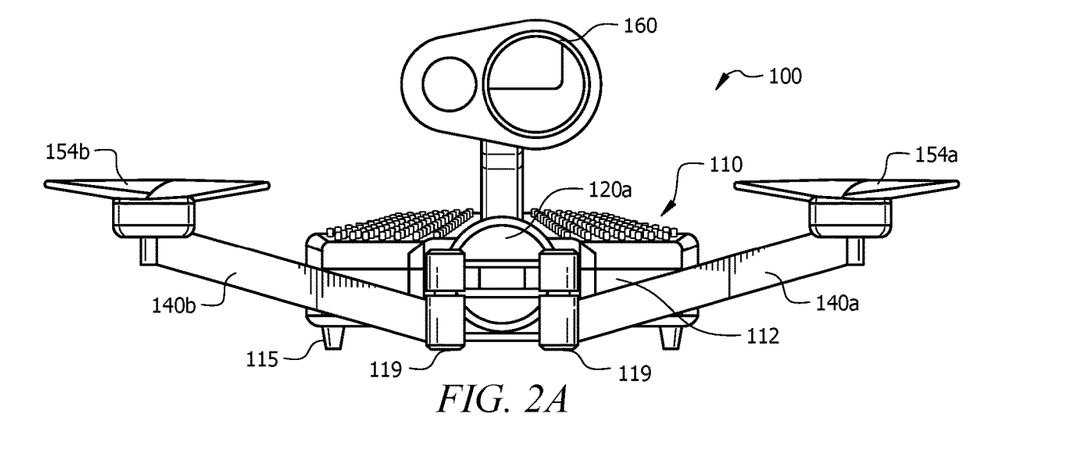
FIG. 2A illustrates a side view of a convertible quadcopter in an upright position, in accordance with certain embodiments.

The convertible body 110 may serve as an exoskeleton with an outer housing that is designed to hold the internal electronic components of the quadcopter 100. (The internal components of the quadcopter 100 are described below in conjunction with FIG. 3.) The outer housing of the convertible body 110 may include, inter alia, a base 112 and an upper surface 118. The base 112 of the convertible body 110 may comprise a bottom planar surface 114 with sides 116 extending therefrom to form a receptacle. One or more landing pads 115 (two are shown) may be formed on or affixed to the bottom planar surface 114 of the base 112. (Additional landing pads 119 may be formed or affixed to the base of the propeller arms, as shown in FIG. 2A.) In an embodiment, and as required by certain applications, the bottom planar surface of the base 112 may also be formed with a cutout 117 or depression operable to receive a GPS antenna.

The upper surface 118 of the convertible body 110 may comprise integrated extended surfaces operable for cooling. Specifically, cooling may be integrated into the outer mold line via the extended surfaces. In an embodiment, the extended surfaces of the upper surface 118 may include an array of pin-fins, fins, or any feature operable to provide increased surface area for exchanging ambient heat. In an embodiment, the integrated extended surfaces may also or alternatively be incorporated on a lower surface, e.g., base 112, of the convertible body 110.

The upper surface 118 of the convertible body 110 may also include a connection mechanism 130 operable for appending a payload 160 (e.g., a sensor) to the convertible body 110. The present disclosure contemplates that any type of payload may be coupled to the upper surface 118 of the convertible body 110. By way of example and not limitation, the payload 160 may comprise one or more video or still cameras, one or more radars, one or more light detection and ranging (LIDAR) devices, one or more 5G-capable communication components, and/or any other sensing or communication technology known or considered in the art. Moreover, although FIGS. 1A and 1B illustrate the connection mechanism 130 with its appended payload 160 on the upper surface 118 of the convertible body 110, it is to be understood that quadcopter 100 may be modified such that connection mechanism 130 may be located on another surface, e.g., one of the sides 116 of the base 112, etc., of the convertible body 110. Moreover, although one connection mechanism 130 with one appended payload 160 is shown in FIGS. 1A and 1B, it is to be understood that any number of connection mechanisms and corresponding payloads may be attached to the quadcopter 100. However, because the convertible body 110 is operable to rotate about its longitudinal axis 170 during flight, thereby allowing the payload 160 a full field of regard, many applications may require only one payload, resulting in greater weight efficiency for the quadcopter 100. In an embodiment, the payload may be operable to rotate about its axis (e.g. vertical axis 180).

Figure 2B:
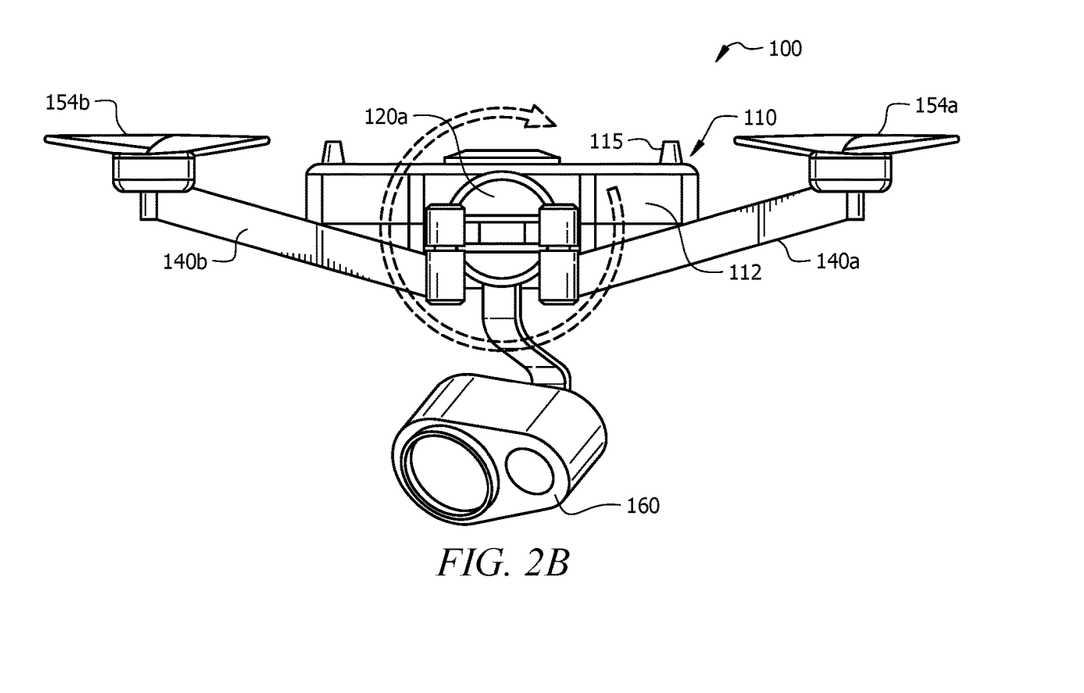
FIG. 2B illustrates a side view of the convertible quadcopter in a converted position, in accordance with certain embodiments.

As described in more detail in conjunction with FIGS. 2A and 2B, the quadcopter 100 may be launched and landed when the convertible body 110 is in an upright position. As shown in FIG. 1A, an "upright position" is defined as a position in which the convertible body 110 is rotated zero degrees (0°) from its initial or starting (unrotated) position. In an embodiment, in the upright position, the bottom planar surface 114 of the convertible body 110 may face directly downward toward the launching/landing platform (not shown) and the upper surface 118 of the convertible body 110 faces upward, with the bottom planar surface 114 perpendicular (or substantially perpendicular) to a vertical axis 180 extending from the ground level. Because the quadcopter 100 of the present disclosure is operable to land in the upright position on its bottom planar surface 114 (more specifically, on the landing pads 115 formed or affixed to the bottom planar surface 114 and/or the landing pads 119 formed or affixed to the base of the propeller arms 140a-d), landing struts that are conventionally required in UAVs with inconvertible suspended sensors may be obviated for weight efficiency.

As shown in FIG. 1B, a "converted position" is a position in which the convertible body 110 is rotated about its longitudinal axis 170 any number of degrees (between zero and 360°) in either the clockwise or counterclockwise direction from its initial position. By way of example, FIG. 1B depicts a 180° rotation of the convertible body 110. In the converted position, the bottom planar surface 114 of the convertible body 110 faces a direction other than directly downward toward the launching/landing platform (with "directly downward" corresponding to zero degrees of rotation).

The quadcopter 100 may further include a plurality of arms 140a-d extending laterally from the convertible body 110 and coupled to the first and second bearing assemblies 120a, 120b. By way of example, and as shown in FIGS. 1A and 1B, first and second arms 140a, 140b may be coupled to the first bearing assembly 120a, and third and fourth arms 140c, 140d may be coupled to the second bearing assembly 120b. In an embodiment, the plurality of arms may be operable to be retracted or collapsed when the quadcopter 100 is not in use, thereby allowing for convenient transport and stowage. As described above, landing pads 119 may also be formed or affixed to the base of the propeller arms 140a-d (as shown in FIG. 2A).

Affixed to each of the plurality of arms 140a-d is a rotor assembly for generating lift. As shown in FIGS. 1A and 1B, a first rotor assembly 150a may be coupled to the first arm 140a; a second rotor assembly 150b may be coupled to the second arm 140b; a third rotor assembly 150c may be coupled to the third arm 140c; and a fourth rotor assembly 150d may be coupled to the fourth arm 140d. Each rotor assembly 150a-d may comprise a motor 152a-d and a propeller 154a-d. The operation of the rotor assemblies 150a-d may be in accordance with conventional rotors known in the art. With respect to conversion, the convertible body 110 rotates relative to (i.e., separate from) its arms 140a-d. In other words, conversion of the convertible body 110 does not require rotation of the arms 140a-d about the longitudinal axis 170.

Reference is now made to FIGS. 2A and 2B, which depict the conversion of the quadcopter 100 during flight. Specifically, FIG. 2A shows the quadcopter 100 in an upright position; FIG. 2B shows the quadcopter in a converted position. The quadcopter 100 of FIGS. 2A and 2B correspond the quadcopter of FIGS. 1A and 1B. As such, similar and corresponding terms described in conjunction with FIGS. 1A and 1B may have the same meaning when used in conjunction with the FIGS. 2A and 2B. As described above, the quadcopter 100 is launched from an upright position, with the bottom planar surface 114 of the base 112 of the convertible body 110 facing the platform from which the quadcopter 100 will be launched. In an embodiment, the quadcopter 100 may be launched by an operator on the ground using, e.g., a remote control device. Once the operator initiates launch (e.g., by selecting a "launch" operation on the remote control device, or otherwise), the quadcopter 100 may autonomously ascend to a predetermined threshold elevation above ground level (e.g., 10 feet, or other pre-programmed elevation) before control of the quadcopter 100 is yielded to the operator. This autonomous launch feature may ensure that the quadcopter 100 is at a safe elevation (i.e., that the payload 160 is protected from low-lying obstructions, etc.) before conversion.

Once the quadcopter 100 has ascended to or exceeded the predetermined threshold elevation, the convertible body 110 of the quadcopter 100 may be operable to rotate clockwise or counterclockwise about its longitudinal axis via the motors that are housed within the first and second bearing assemblies 120a, 120b (FIGS. 2A and 2B show only the first bearing assembly 120a). For purposes of illustration, FIG. 2B shows the convertible body 110 in a converted position, i.e., rotated clockwise 180° degrees. However, it is to be understood that conversion may be performed to any degree of rotation.

In an embodiment, the weight of the convertible body 110 may be dominant, and the center of mass of the quadcopter 100 may be at or substantially near the convertible body's 110 axis of rotation, i.e., the longitudinal axis 170. Due to the mass of the convertible body 110 relative to the arms 140a-d, a pre-programmed control law may autonomously adjust the propeller force eccentrically to bear during conversion. In other words, in accordance with the present disclosure, the quadcopter 100 provides an autonomous system that changes the force of the propellers 154a-d to counterbalance the convertible body 110 when the latter is in rotation. Thus, for example, as shown in FIG. 2B, when the convertible body 110 rotates clockwise, the right propellers (propeller 154a is shown, and propeller 154c is not shown) will increase their applied force (e.g., by increasing their speed) and the left propellers (propeller 154b is shown, and propeller 154d is not shown) will decrease their applied force (e.g., by decreasing their speed) to counterbalance the rotation of the convertible body 110. Once the convertible body 110 has rotated to its target position, the propellers 154a-d may resume normal operation. The autonomous adjustment of the force of propellers 154a-d may also be activated in response to any other eccentric load.

With respect to landing, when an operator initiates landing (e.g., by selecting a "land" operation on the remote control device, or otherwise), the convertible body 110 of the quadcopter 100 may autonomously return/rotate to the upright position and land. In an embodiment, the quadcopter 100 may be precluded from descending below the predetermined threshold elevation when in a converted position, i.e., when not in an upright position. In this manner, the quadcopter 100 may be operable to land on the bottom planar surface 114 of its base 112, thereby obviating the requirement for any landing struts.

While the present disclosure describes conversion of the quadcopter 100 based on the rotation of its convertible body 110 about a longitudinal axis, it is to be understood that the quadcopter 100 may also be operable to rotate about its other axes, e.g., yaw and pitch axes.

Figure 3:
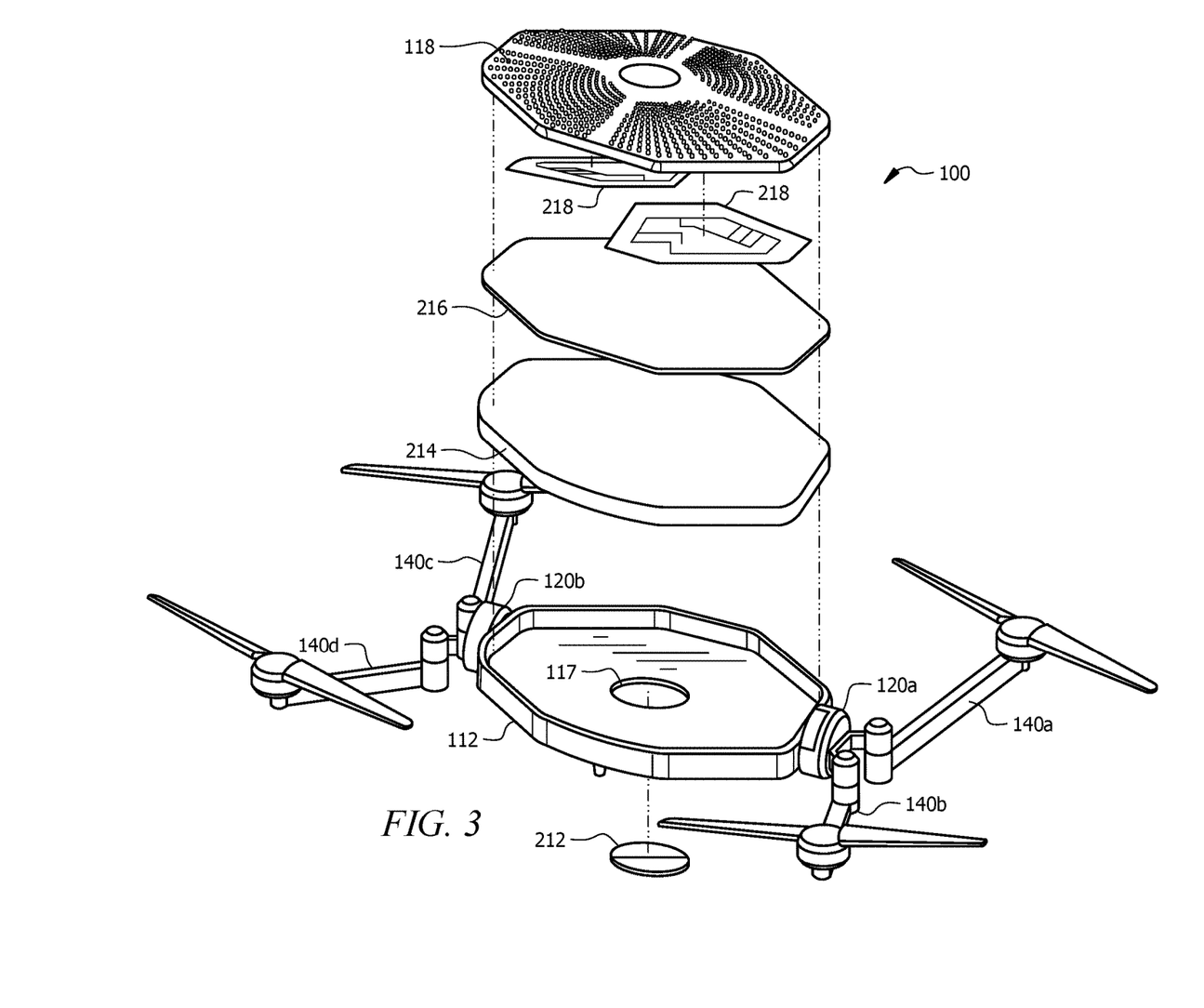
FIG. 3 illustrates an exploded view of the components of a body of a convertible quadcopter, in accordance with certain embodiments.

Reference is now made to FIG. 3, where is shown an exploded view showing the internal and other electronic components housed within the convertible body 110 of the quadcopter 100. The quadcopter 100 of FIG. 3 corresponds to the quadcopters depicted in FIGS. 1A, 1B, 2A, and 2B. As such, similar and corresponding terms described in conjunction with FIGS. 1A, 1B, 2A, and 2B may have the same meaning when used in conjunction with the FIG. 3. In an embodiment, the quadcopter 100 of the present disclosure may be based on a holistic design, wherein the outer housing of the convertible body 110 serves as an exoskeleton and the internal components are packaged for integration within the outer housing of the convertible body 110. As a result, the internal electronic components of the quadcopter 100 form a part of its structural design, generating stiffness and sharing in the physical and structural load of the design. As a result of this multifunctional design, a net reduction in the weight of the quadcopter 100 is anticipated.

As shown in FIG. 3, the internal electronic components may be loaded and stacked into the base 112 of convertible body 110. It is to be understood that the internal electronic components of FIG. 3 are shown for purposes of example and not limitation; certain components may be added to or removed from the quadcopter 100 based on particular applications. Likewise, components may be arranged in any form or manner, without departing from the scope of the present disclosure.

Internal electronic components may include a global positioning system (GPS) antenna 212, e.g., used in conjunction with LIDAR or other applications. In an embodiment, the base 112 may be formed with a cutout 117 or depression operable to receive the GPS antenna. Internal electronic components may also include an internal battery 214. In an embodiment, the internal battery 214 may be custom-designed to conform to the size and shape of the base 112 to create stiffness. In an embodiment, the internal battery 214 may form part of the structural load-sharing of the quadcopter 100.

Internal electronic components may further comprise a circuit board 216 for coupling to the internal battery 214. In an embodiment, the circuit board 216 may comprise a mid-plane power and control circuit card assembly (CCA) operable to perform various functionality, including DC-to-DC conversion and filtering, digital and control bussing, and cross-platform communications.

As described above, an upper surface 118 of the convertible body 110 may affixed to the base 112. The upper surface 118 may comprise integrated extended surfaces operable for cooling, such as pin-fins, fins, or any feature operable to provide increased surface area for exchanging ambient heat. During flight of the quadcopter 100, heat generated from the internal electronic components of the convertible body 110 may be dissipated to the upper surface 118 of the convertible body 110. The movement of the air around the quadcopter 100, through the rotation of its convertible body 110 and/or movement of its propellers 154a-d, provides cooling into the ambient environment. In certain embodiments, radio and/or processor boards 218 may also be included in the convertible body 110. These may be mounted to the underside of the upper surface 118, and may also be cooled by conduction through the upper surface 118.

In an embodiment, the quadcopter 100 is designed to minimize size, weight and power (SWaP) in accordance with its specific application. As described above, the present disclosure allows for SWaP efficiency by virtue of its specific design features. For example, by providing a mechanism for a given payload to have a full field of regard, the disclosed quadcopter requires only a single payload, thereby effectively reducing at least its size and weight. Moreover, the landing features of the quadcopter, including landing pads on its bottom planar surface and/or on base of the propeller arms, obviates the need for landing struts. Finally, by integrating the design such that one or more internal electronic components of the quadcopter serve not only specified electrical functions, but also contribute to the structural and load-sharing design of the quadcopter, SWaP efficiency is further attained.

Figure 4:
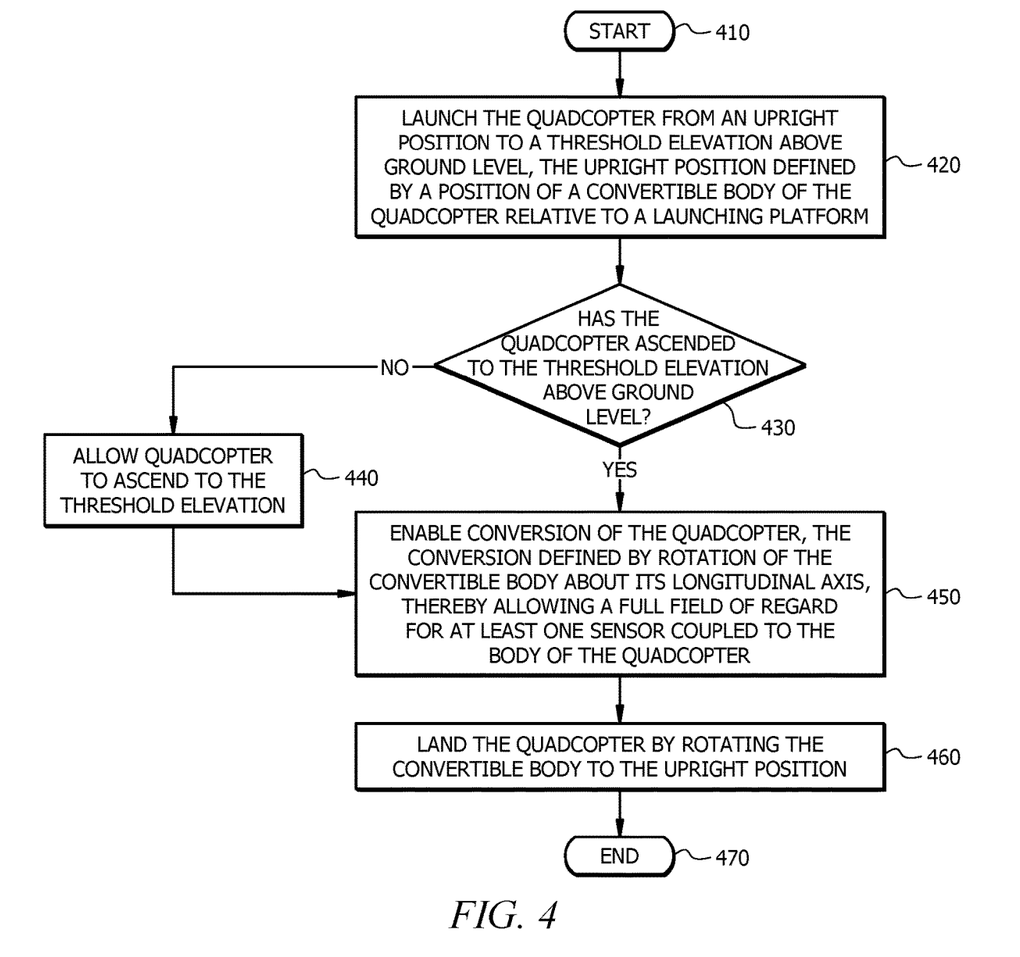
FIG. 4 illustrates a flow diagram of example operations carried by a computer system in operating a quadcopter, in accordance with certain embodiments.

Reference is now made to FIG. 4, wherein is shown example operations 400 carried out by one or more computer implemented systems in the operation of a quadcopter. It is to be understood that certain operations of the quadcopter, including but not limited to its flight, conversion, launching, and landing mechanisms, may be controlled by one or more computer systems. In an embodiment, the one or more computer implemented systems may be embodied in the UAV. In another embodiment, the one or more computer implemented systems may partially be implemented in the UAV and partially at a ground location. In yet another embodiment, one or more computer implemented systems may be implemented at a ground location. Additionally, it is to be understood that the operations 400 of FIG. 4 may be in accord with the operations outlined in conjunction with the quadcopter 100 described in FIGS. 1A-1B, 2A-2B, and 3. As such, similar and corresponding terms described in conjunction with the above figures may have the same meaning when used in conjunction with the operations 400 of FIG. 4. Additionally, the present disclosure incorporates by reference the description of FIGS. 1A-1B, 2A-2B, and 3 for the purposes of explaining, expounding upon, or otherwise clarifying the operations 400 of FIG. 4. Moreover, while the operations 400 are described in conjunction with a quadcopter, it is to be understood that the operations 400 may be carried out by one or more computer implemented systems in the operation of any unmanned aerial vehicle (UAV).

In accordance with the descriptions of the quadcopter 100 above, the operations 400 presume that the quadcopter comprises a convertible body operable to be coupled to at least one sensor or payload. The operations 400 of a computer implemented system may begin at step 410. At step 420, the quadcopter may be launched from an upright position to a predetermined threshold elevation above ground level. The upright position may be defined by rotation of the convertible body zero degrees (0°) from its initial (unrotated) position. In other words, when the convertible body is in an upright position, it is not rotated. In an embodiment, where the convertible body of the quadcopter comprises an upper surface and a base having a bottom planar surface, the upright position may further be defined as a position in which a bottom planar surface of the convertible body faces directly downward toward the launching/landing platform and the upper surface of the convertible body faces upward, with the bottom planar surface perpendicular (or substantially perpendicular) to a vertical axis extending from the ground level.

In an embodiment, the operation of launching may be initiated by an operator on the ground by selecting a "launch" feature on a remote control or other device. When launched, the quadcopter may autonomously ascend to a predetermined threshold elevation above ground level (e.g., 10 feet, or other pre-programmed elevation) before control of the quadcopter is yielded to the operator. This autonomous launch feature may ensure that the quadcopter is at a safe elevation (i.e., that the payload is protected from low-lying obstructions) before conversion.

At step 430, a determination may be made as to whether the quadcopter has ascended at least to the predetermined threshold elevation above ground level. If, at step 430, it is determined that the quadcopter has not ascended to the predetermined threshold elevation above ground level, the operations may proceed to step 440, wherein the quadcopter is allowed to continue ascent to at least the predetermined threshold elevation. If, at step 430, it is determined that the quadcopter has ascended at least to the predetermined threshold elevation above ground level, the operations may proceed to step 450, wherein conversion of the quadcopter may be enabled.

Conversion may be defined by rotation of the convertible body about its longitudinal axis any number of degrees (between zero and 360°) in either the clockwise or counterclockwise direction from its initial position, thereby allowing a full field of regard for any sensor that may be coupled to the body of the quadcopter. In an embodiment, the weight of the convertible body may be dominant, and the center of mass of the quadcopter may be at or substantially near the convertible body's longitudinal axis of rotation. Due to the mass of the convertible body relative to the arms, a pre-programmed control law may autonomously adjust the propeller force eccentrically to bear during conversion. In other words, in accordance with the present disclosure, the quadcopter provides an autonomous system that changes the force of the propellers to counterbalance the convertible body when the latter is in rotation, based on a direction of rotation of the convertible body. Thus, for example, when the convertible body rotates clockwise, its right propellers may increase their applied force (e.g., by increasing their speed) and the left propellers may decrease their applied force (e.g., by decreasing their speed) to counterbalance the rotation. The autonomous adjustment of the force of propellers may also be activated in response to any other eccentric load. Once the convertible body has rotated to its target position, the propellers may resume normal operation.

At step 460, the quadcopter may be landed by returning/rotating the convertible body back to its upright position. Specifically, when an operator initiates landing (e.g., by selecting a "land" operation on the remote control device, or otherwise), the convertible body of the quadcopter may autonomously return to the upright position and then land. In an embodiment, the quadcopter may be precluded from descending below the predetermined threshold elevation when in a converted position, i.e., when not in an upright position. In this manner, the quadcopter may be operable to land on the bottom planar surface of its base, thereby obviating the requirement for any landing struts or computer systems associated therewith. At step 470, the operations may end.

In sum, the systems and operations described herein may allow for the in-flight conversion of UAVs, such as quadcopters, such that an appended sensor has a full field of regard (e.g., 360° view, above and below its equator). As a result, unlike conventional quadcopter designs that require multiple sensors to cover various views, the quadcopters of the present disclosure require only a single sensor suite, thereby allowing for a simplified design and greater weight efficiency. Additionally, in accordance with the present disclosure, the quadcopter of the present disclosure is designed holistically, wherein the internal components are designed and packaged for integration within the outer housing of the convertible body. As a result, the internal electronic components of the quadcopter contribute to its structural design to generate stiffness and provide for load sharing. This multifunctional integrated design yields a net weight reduction in the quadcopter. While specific advantages have been enumerated above, various embodiments may include all, some, or none of the enumerated advantages.

Figure 5:
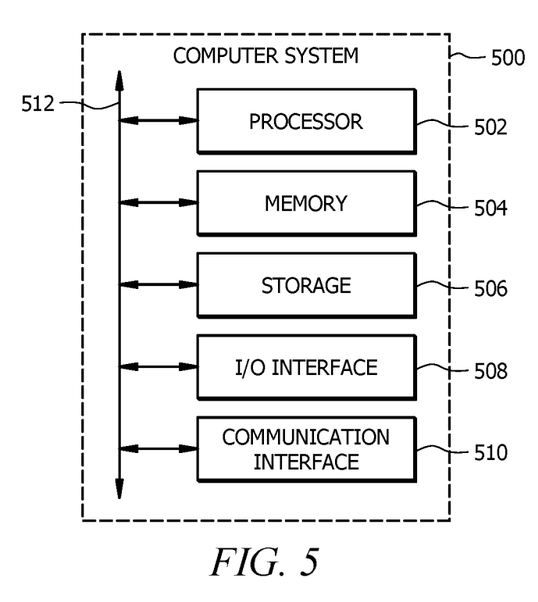
FIG. 5 illustrates a computer system, in accordance with certain embodiments.

Reference is now made to FIG. 5, wherein is shown an example computer system 500. In particular embodiments, one or more computer systems 500 may be utilized by the quadcopter 100 for any functionality requiring computerized control. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

While the disclosed subject matter is described herein in terms of certain embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to a UAV or quadcopter throughout this disclosure, other aerial vehicles may be adapted in accordance with and/or perform the operations disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A computer implemented system for operating an unmanned aerial vehicle (UAV), comprising:
  one or more processors;
  one or more computer-readable non-transitory storage media comprising instructions that, when executed by the one or more processors, cause performance of operations comprising:
    launching the UAV from an upright position to at least a predetermined threshold elevation above ground level, the upright position defined by nonrotation of a convertible body of the UAV from an initial position;
    enabling conversion of the UAV, the conversion defined by rotating the convertible body about a longitudinal axis, the conversion operable to achieve a full field of regard for at least one payload coupled to the convertible body of the UAV; and
    returning the UAV to the upright position for landing;
  wherein the UAV is operable to descend below the predetermined threshold elevation only when the convertible body is in the upright position.

2. The computer implemented system of claim 1, wherein the convertible body comprises an outer housing defined by at least an upper surface and a base having a bottom planar surface.

3. The computer implemented system of claim 2, wherein the upright position is further defined as a position in which the bottom planar surface of the convertible body is perpendicular to a vertical axis extending from the ground level.

4. The computer implemented system of claim 2, wherein the at least one payload is coupled to the upper surface of the convertible body.

5. The computer implemented system of claim 1, wherein the UAV comprises a plurality of arms, each arm of the plurality of arms including a rotor assembly having a motor and at least one propeller.

6. The computer implemented system of claim 5, wherein enabling conversion further comprises:
autonomously adjusting a force of each propeller of the at least one propeller based on a direction of rotation of the convertible body, the force of each propeller operable to counterbalance the rotation of the convertible body.

7. The computer implemented system of claim 1, wherein launching the UAV to at least the predetermined threshold elevation is autonomous.

8. The computer implemented system of claim 7, wherein control is passed to an operator after the UAV reaches at least the predetermined threshold elevation.

9. The computer implemented system of claim 1, wherein of returning the UAV to the upright position for landing is autonomous.

10. A method for operating an unmanned aerial vehicle (UAV), comprising:
launching the UAV from an upright position to at least a predetermined threshold elevation above ground level, the upright position defined by nonrotation of a convertible body of the UAV from an initial position;
enabling conversion of the UAV, the conversion defined by rotating the convertible body about a longitudinal axis, the conversion operable to achieve a full field of regard for at least one payload coupled to the convertible body of the UAV; and
returning the UAV to the upright position for landing;
wherein the UAV is operable to descend below the predetermined threshold elevation only when the convertible body is in the upright position.

11. The method of claim 10, wherein the convertible body comprises an outer housing defined by at least an upper surface and a base having a bottom planar surface.

12. The method of claim 11, wherein the upright position is further defined as a position in which the bottom planar surface of the convertible body is perpendicular to a vertical axis extending from the ground level.

13. The method of claim 11, wherein the at least one payload is coupled to the upper surface of the convertible body.

14. The method of claim 10, wherein the UAV comprises a plurality of arms, each arm of the plurality of arms including a rotor assembly having a motor and at least one propeller.

15. The method of claim 14, wherein enabling conversion further comprises:
autonomously adjusting a force of each propeller of the at least one propeller based on a direction of rotation of the convertible body, the force of each propeller operable to counterbalance the rotation of the convertible body.

16. The method of claim 10, wherein launching the UAV to at least the predetermined threshold elevation is autonomous.

17. The method of claim 16, wherein control is passed to an operator after the UAV reaches at least the predetermined threshold elevation.

18. The method of claim 10, wherein of returning the UAV to the upright position for landing is autonomous.

* * * * *